(12) United States Patent
Benosman et al.

(10) Patent No.: US 12,422,824 B2
(45) Date of Patent: Sep. 23, 2025

(54) SYSTEM AND METHOD FOR CONTROLLING AN OPERATION OF A MACHINE INCLUDING AT LEAST ONE ACTUATOR

(71) Applicant: Mitsubishi Electric Research Laboratories, Inc., Cambridge, MA (US)

(72) Inventors: Mouhacine Benosman, Cambridge, MA (US); Siqi Zhang, Urbana, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 423 days.

(21) Appl. No.: 18/107,579

(22) Filed: Feb. 9, 2023

(65) Prior Publication Data
US 2024/0272615 A1    Aug. 15, 2024

(51) Int. Cl.
G05B 19/4155 (2006.01)
G05B 13/02 (2006.01)

(52) U.S. Cl.
CPC ..... *G05B 19/4155* (2013.01); *G05B 13/0235* (2013.01); *G05B 2219/31372* (2013.01)

(58) Field of Classification Search
None
See application file for complete search history.

(56) References Cited

U.S. PATENT DOCUMENTS

2021/0124320 A1* 4/2021 Benosman ............. G05B 17/02
2021/0124321 A1* 4/2021 Benosman ............. G05B 17/02

* cited by examiner

Primary Examiner — Ryan A Jarrett
(74) Attorney, Agent, or Firm — Gene Vinokur

(57) ABSTRACT

The present disclosure discloses a system and a method for controlling an operation of a machine including at least one actuator. The method comprises obtaining a time period of an operation of the at least one actuator, collecting an energy level of the at least one actuator, and determining one or more hyperparameters of a time bound function such that a value of the time bound function is greater than or equal to the time period of the operation of the at least one actuator. The method further comprises solving an optimal control problem optimizing a cost function of the operation of the at least one actuator using an adaptive gradient descent method that is initialized with the collected energy level and a constant defined based on the one or more hyperparameters and controlling the at least one actuator based on a solution of the optimal control problem.

20 Claims, 11 Drawing Sheets

Input: Initial point $x_0$, stepsizes $\eta$, gradient flow $F(\cdot)$ ($F_{q\text{-NGF}}$ or $F_{q\text{-SGF}}$)

1: for all $k = 0, 1, \ldots, K$ do
2:     Attain the gradient $\nabla f(x_k)$   — 201
3:     Set $\eta_k = \min\left\{h_\infty, \dfrac{h_1}{\|\nabla f(x_k)\|_2^{q-1}}\right\}$   — 203
4:     Update: $x_{k+1} = x_k - \eta_k \nabla f(x_k)$   — 205
5: end for

Output: $x_K$

FIG. 2

Input: Initial point $x_0$, stepsizes $\eta$, gradient flow $F(\cdot)$ ($F_{q\text{-}\mathrm{RGF}}$ or $F_{q\text{-}\mathrm{SGF}}$)

1: for all $k = 0, 1, \ldots, K$ do
2:     Attain the gradient $\nabla f(x_k)$
3:     Set $\eta_k = \min\left\{h_e, -c\|\nabla f(x_k)\|\frac{q-1}{q+1}\|\nabla f(x_k)\|^{-1} \mathrm{sgn}(\nabla f(x_k))\right\}$ $$x_{k+1} = x_k - \eta_k \|\nabla f(x_k)\|\frac{q-1}{q+1}\|\nabla f(x_k)\|^{-1} \mathrm{sgn}(\nabla f(x_k))$$

$$x_{k+1} = x_k - \eta_k \frac{\nabla f(x_k)}{\|\nabla f(x_k)\|^{\frac{q-2}{q+1}}\|\nabla f(x_k)\|^{\frac{1}{q+1}}}$$

4:     Update: $x_{k+1} = x_k - \eta_k \nabla f(x_k)$
5: end for

Output: $x_K$

FIG. 3

SYSTEM AND METHOD FOR CONTROLLING AN OPERATION OF A MACHINE INCLUDING AT LEAST ONE ACTUATOR

TECHNICAL FIELD

The present disclosure relates generally to control systems, and more particularly to a system and a method for controlling an operation of a machine including at least one actuator.

BACKGROUND

Controlling performance of a manufacturing process, where fast and powerful machines can execute complex sequences of operations at high speeds is a challenging task. Deviations from an intended sequence of operations or timing of execution of the operations can degrade quality, waste raw materials, cause downtimes, broken equipment, and decrease output. For these reasons, the manufacturing processes shall be meticulously designed to minimize unexpected events, and also safeguards need to be designed into a production line, using a variety of sensors and emergency switches.

There can be different types of the manufacturing processes, which include process manufacturing and discrete manufacturing. In the process manufacturing, products are generally undifferentiated, for example, oil, natural gas, and salt. The discrete manufacturing produces distinct items, e.g., automobiles, furniture, toys, and airplanes. Regardless of its type, a modern manufacturing process can include a number of operations that are independent of each other but need to be executed in a synchronous manner with a very tight schedule. For example, in a number of assembly operations, two independent processes need to be performed sequentially or even concurrently with milliseconds of precision.

Precision of time synchronization of the operations of the manufacturing process can be affected by external and internal disturbances. The external disturbance may come from the versatility of the manufacturing process. For example, an object to be assembled can be placed in different positions, which can be treated as a disturbance external to the assembly operation. Conversely, the assembly of the object at one position can take more time than the assembly of the object at a different position. Such a difference can be treated as the internal disturbance that can affect the synchronization of different manufacturing operations.

Accordingly, there is a need for a system and a method for controlling a manufacturing operation suitable for being synchronized with other independent manufacturing operations in a presence of external and internal disturbances.

SUMMARY

It is an object of some embodiments to provide a system and a method for controlling a manufacturing operation suitable for being synchronized with other independent manufacturing operations in a presence of external and internal disturbances. Examples of the manufacturing operation include an assembly operation performed by synchronized actions of different robotic manipulators, moving an object through a sequence of locations, machining a workpiece by different tools in a predetermined sequential or partially overlapping order, and a combination thereof.

Some embodiments are based on the realization that the external disturbances acting on the manufacturing operation can be addressed using principles of optimal control theory. The optimal control theory is a branch of mathematical optimization that deals with determining a control for a dynamical system over a period of time such that a cost function is optimized. The cost function can be optimized to reject the external disturbances. For example, a cost function can be optimized to place an object from varying initial positions to the same or different target positions within a specified time period. The time period can be predetermined with respect to possible variations of positions but provides a bound on a placement operation that other manufacturing operations can use in their timing calculations. For example, in one embodiment, based on a time bound, a speed of a conveyor belt for moving an object to be assembled is calculated.

To that end, some embodiments use control methods optimizing a cost function for synchronous control of different manufacturing operations. Such an approach is counterintuitive for a number of manufacturing operations that use predetermined control policies that are simpler to execute in-real time. However, predetermined control policies may fail to consider the external disturbances.

However, based on a number of experiments and simulations, it was realized that optimal solutions, while addressing the problem of external disturbances, create another problem affecting an accuracy of synchronization. The cost functions are optimized using different iterative solvers, such as a gradient descent method and its variations. Different independent processes may optimize different cost functions. Based on specifics of the manufacturing operation, optimization of the different cost functions may use a different number of iterations to determine the optimal solution. For high precision operations, unpredictability of the number of iterations till convergence during an optimal solution of an optimal control problem poses another synchronization problem.

To that end, it is an object of some embodiments to provide a gradient descent method converging to an optimal solution within a predetermined time limit. Additionally or alternatively, it is an object of some embodiments to provide such a gradient descent method that can be used to optimize the cost functions specifying control of different and independent manufacturing operations within the same time limit. Additionally or alternatively, it is an object of some embodiments to provide an adaptive gradient descent method that varies its update step to achieve convergence to the optimal solution within the predetermined time limit.

Some embodiments are based on a realization that the convergence to an optimal solution of an optimal control problem can be treated as stability of a virtual system having dynamics of the optimal control problem defined based on the cost function. Indeed, determining a solution to a cost function can be seen as minimizing an energy of the virtual system with the dynamics of the cost function with respect to an equilibrium defined by optimal values of optimization variables the optimal control problem aims to optimize. If the energy is a difference between the cost function at a current time step and an unknown optimal cost, the equilibrium around an optimal cost is when the energy is minimum, and thus the virtual system with energy of the optimal control problem is stable. In other words, determining the optimal solution to the optimal control problem can be contemplated as determining a stable position, i.e., equilibrium, of a system having dynamics of the optimal control problem. Hence, the optimal control problem and specifically a gradient descent method iteratively determining the optimal solution to the optimal control problem can be analyzed with the help of Lyapunov functions.

The cost functions are typically represented by ordinary differential equations (ODEs), and Lyapunov functions are scalar functions that may be used to prove stability of equilibrium of an ODE. For certain classes of ODEs, existence of the Lyapunov functions is a necessary and sufficient condition for stability. Using stability theory of dynamical systems and control theory, it can be shown that for stability of the system, a derivative of a Lyapunov function describing an energy of the system needs to be negative definite. In addition, the Lyapunov function has other performance guarantees. Specifically, according to principles of Lyapunov differential inequality, a derivative of an energy function converges to stability at a finite time. The finite time depends on an initial energy level, which can be a preselected constant, and other constants of Lyapunov differential inequality that can be preselected by a user.

Further, some embodiments are based on the realization that a step size of the gradient descent method can be adapted based on an energy function of the optimal control problem that follows Lyapunov stability. Such an adaptation can force the gradient descent method to reach stability, i.e., reach convergence, in the finite time guaranteed by the principles of the Lyapunov differential inequality.

Thus, some embodiments adapt the step size of the gradient descent method to optimize the cost function within the predetermined time limit. For different iterations of the gradient descent method, the step size is determined based on a derivative of the energy function of the optimal control problem. The energy function of the optimal control problem is defined such that the derivative of the energy function is negative definite and polynomially decreasing. The negative definite requirement guarantees the convergence, while the polynomially decreasing requirement speeds up the convergence. These requirements can be satisfied by selecting appropriate constants of the Lyapunov differential inequality.

For example, consider a cost function $f:R^n \to R$ to be optimized. Let x* be an arbitrary optimal point of $f$ that is unknown. According to an embodiment, the Lyapunov differential inequality is given as $\dot{E} \leq -cE(t)^\alpha$, a.e.t≥0, with hyperparameters c>0 and α<1, for absolutely continuous functions E such that E(0)>0. Under the aforementioned conditions, E(0)→0 is reached in finite time $$t \to t^* \leq \frac{E(0)^{1-\alpha}}{c(1-\alpha)} < \infty.$$

To that end, at first, a time period (t*) of an operation of an actuator of a machine is obtained. For instance, the time period (t*) of the operation of the actuator may be received from the user. The time period (t*) may correspond to an upper bound on time within which the operation has to be executed. Further, an energy level (E(0)) of the actuator is collected. In an embodiment, the energy level of the actuator corresponds to a difference between a current state and a desired state of the actuator. Furthermore, the controller determines values of hyperparameters (c and α) of a time bound function $$\frac{E(0)^{1-\alpha}}{c(1-\alpha)}.$$

The values of the hyperparameters are determined such that a value of the time bound function is greater than or equal to the obtained time period (t*) of the operation of the actuator.

Further, an optimal control problem optimizing a cost function of the operation of the actuator is solved using an adaptive gradient descent method. The adaptive gradient descent method is initialized with the energy level collected for the actuator and a constant defined based on the values of the hyperparameters and includes a varying step size. The varying step size is selected based on a derivative of an energy function of the corresponding optimal control problem defined such that the derivative of the energy function of the optimal control problem is negative definite and polynomially decreasing. Furthermore, the actuator is controlled based on a solution of the optimal control problem.

Accordingly, one embodiment discloses a controller for controlling an operation of a machine including at least one actuator. The controller comprises a processor; and a memory having instructions stored thereon that, when executed by the processor, cause the controller to: obtain a time period of an operation of the at least one actuator; collect an energy level of the at least one actuator, wherein the energy level of the at least one actuator corresponds to a difference between a current state and a desired state of the at least one actuator; determine values of one or more hyperparameters of a time bound function such that a value of the time bound function is greater than or equal to the time period of the operation of the at least one actuator; solve an optimal control problem optimizing a cost function of the operation of the at least one actuator using an adaptive gradient descent method, wherein the adaptive gradient descent method is initialized with the collected energy level and a constant defined based on the values of one or more hyperparameters, and wherein the adaptive gradient descent method includes a varying step size selected based on a derivative of an energy function of the optimal control problem defined such that the derivative of the energy function of the optimal control problem is negative definite and polynomially decreasing; and control the at least one actuator based on a solution of the optimal control problem.

Accordingly, another embodiment discloses a method for controlling an operation of a machine including at least one actuator. The method comprises obtaining a time period of an operation of the at least one actuator; collecting an energy level of the at least one actuator, wherein the energy level of the at least one actuator corresponds to a difference between a current state and a desired state of the at least one actuator; determining values of one or more hyperparameters of a time bound function such that a value of the time bound function is greater than or equal to the time period of the operation of the at least one actuator; solving an optimal control problem optimizing a cost function of the operation of the at least one actuator using an adaptive gradient descent method, wherein the adaptive gradient descent method is initialized with the collected energy level and a constant defined based on the values of one or more hyperparameters, and wherein the adaptive gradient descent method includes a varying step size selected based on a derivative of an energy function of the optimal control problem defined such that the derivative of the energy function of the optimal control problem is negative definite and polynomially decreasing; and controlling the at least one actuator based on a solution of the optimal control problem.

Accordingly, yet another embodiment discloses non-transitory computer-readable storage medium embodied thereon a program executable by a processor for performing a method for controlling an operation of a machine including at least one actuator. The method comprises obtaining a time period of an operation of the at least one actuator; collecting an energy level of the at least one actuator, wherein the energy level of the at least one actuator corresponds to a difference between a current state and a desired state of the at least one actuator; determining values of one or more hyperparameters of a time bound function such that a value of the time bound function is greater than or equal to the time period of the operation of the at least one actuator; solving an optimal control problem optimizing a cost function of the operation of the at least one actuator using an adaptive gradient descent method, wherein the adaptive gradient descent method is initialized with the collected energy level and a constant defined based on the values of one or more hyperparameters, and wherein the adaptive gradient descent method includes a varying step size selected based on a derivative of an energy function of the optimal control problem defined such that the derivative of the energy function of the optimal control problem is negative definite and polynomially decreasing; and controlling the at least one actuator based on a solution of the optimal control problem.

BRIEF DESCRIPTION OF THE DRAWINGS

FIG. 2 illustrates a first order rescaled clipping algorithm, wherein a varying step-size is inversely proportional to a 2-norm of a gradient of a cost function, according to some embodiments of the present disclosure.

FIG. 3 illustrates a first order rescaled clipping algorithm, wherein the varying step-size is a function of a component-wise sign function of the gradient of the cost function, according to some embodiments of the present disclosure.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

It is an object of some embodiments to provide a system and a method for controlling an operation of a machine including an actuator. It is also an object of some embodiments to provide a system and a method for controlling an operation suitable for being synchronized with other independent operations in a presence of external and internal disturbances.

Figure 1A:
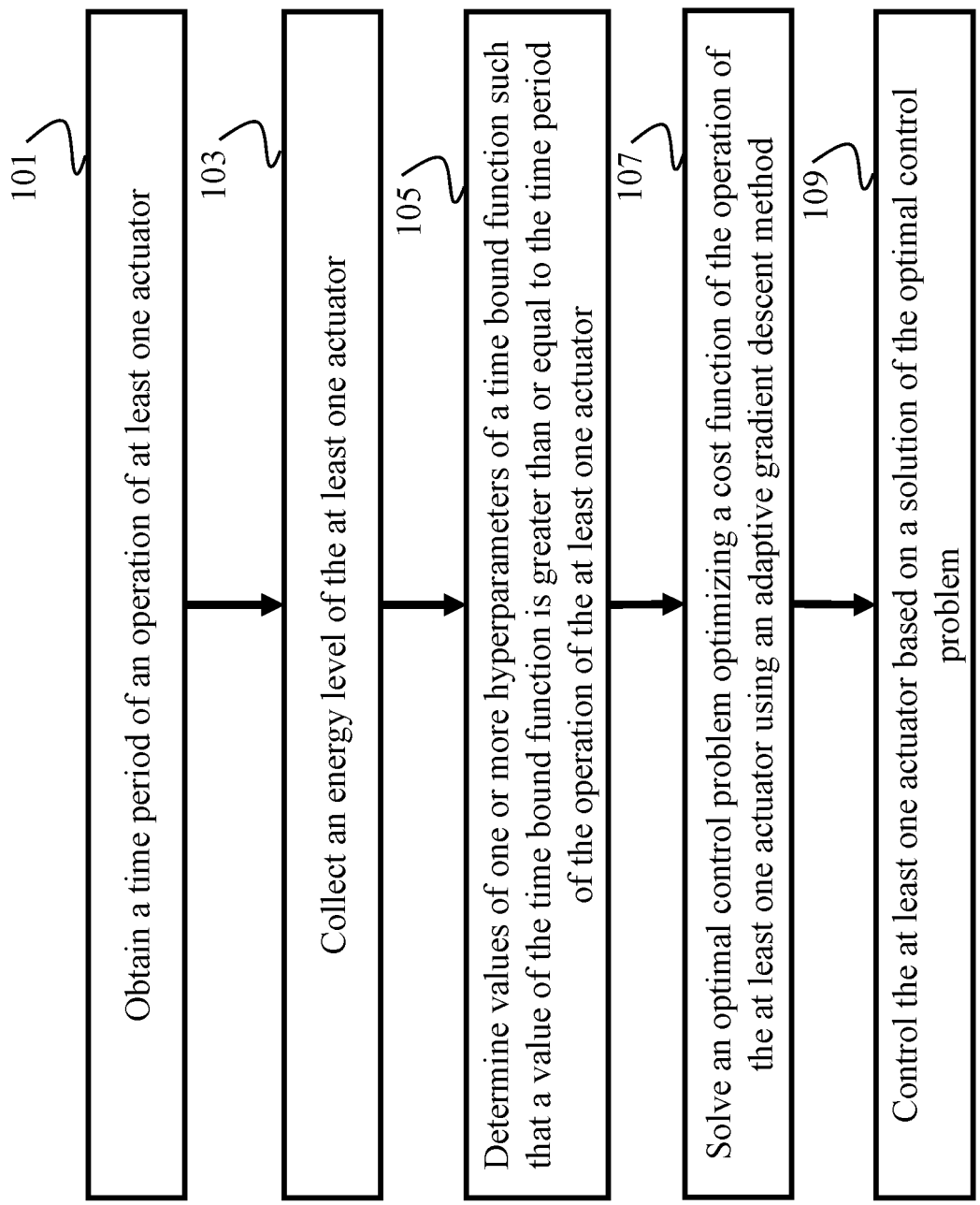
FIG. 1A shows a block diagram of a method for controlling an operation of a machine, according to an embodiment of the present disclosure.

FIG. 1A shows a block diagram for controlling the operation of the machine, according to an embodiment of the present disclosure. The machine may be an assembly system or assembly setup configured to perform a manufacturing operation. Examples of the manufacturing operation include an assembly operation performed by synchronized actions of different robotic manipulators, moving an object through a sequence of locations, machining a workpiece by different tools in a predetermined sequential or partially overlapping order, and a combination thereof.

The manufacturing operation can include a number of operations that need to be executed in a synchronous manner. For example, in a number of assembly operations, two independent processes need to be performed sequentially or even concurrently with milliseconds of precision. Precision of time synchronization of the manufacturing operations can be affected by external disturbances. The external disturbances may come from versatility of the manufacturing operation. For example, an object to be assembled can be placed in different positions, which can be treated as a disturbance external to the assembly operation.

Some embodiments are based on the realization that the external disturbances acting on the manufacturing operation can be addressed using principles of optimal control theory. The optimal control theory is a branch of mathematical optimization that deals with determining a control for a dynamical system over a period of time such that a cost function is optimized. The cost function can be optimized to reject the external disturbances. For example, a cost function can be optimized to place an object from varying initial positions to the same or different target positions within a specified time period. The time period can be predetermined with respect to possible variations of positions but provides a bound on a placement operation that other manufacturing operations can use in their timing calculations. For example, in one embodiment, based on a time bound, a speed of a conveyor belt for moving an object to be assembled is calculated.

To that end, the actuator is associated with a cost function to be optimized and an optimal control problem optimizing the cost function is solved to determine an optimal solution for controlling the operation of the machine. However, based on a number of experiments and simulations, it was realized that the optimal solutions, while addressing the problem of external disturbances, create another problem affecting an accuracy of synchronization. The cost functions may be optimized using different iterative solvers, such as a gradient descent method and its variations. Different independent processes may optimize different cost functions. Based on specifics of the manufacturing operation, optimization of the different cost functions may use a different number of iterations to determine the optimal solution. For high precision operations, unpredictability of the number of iterations till convergence during the optimal solution of the optimal control problem poses another synchronization problem.

To that end, it is an object of some embodiments to provide a gradient descent method converging to an optimal solution within a predetermined time limit. Additionally or alternatively, it is an object of some embodiments to provide such a gradient descent method that can be used to optimize the cost functions specifying control of different and independent manufacturing operations within the same time limit. Additionally or alternatively, it is an object of some embodiments to provide such a gradient descent method that varies its update step to achieve convergence to the optimal solution within the predetermined time limit.

Some embodiments are based on a realization that the convergence to an optimal solution of an optimal control problem can be treated as stability of a virtual system having dynamics of the optimal control problem defined based on the cost function. Indeed, determining a solution to a cost function can be seen as minimizing an energy of the virtual system with the dynamics of the cost function with respect to an equilibrium defined by optimal values of optimization variables the optimal control problem aims to optimize. If the energy is a difference between the cost function at a current time step and an unknown optimal cost, the equilibrium around an optimal cost is when the energy is minimum, and thus the virtual system with energy of the optimal control problem is stable. In other words, determining the optimal solution to the optimal control problem can be contemplated as determining a stable position, i.e., equilibrium, of a system having dynamics of the optimal control problem. Hence, the optimal control problem and specifically a gradient descent method iteratively determining the optimal solution to the optimal control problem can be analyzed with the help of Lyapunov functions.

The cost function is typically represented by ordinary differential equations (ODEs), and Lyapunov functions are scalar functions that may be used to prove stability of equilibrium of an ODE. For certain classes of ODEs, existence of the Lyapunov functions is a necessary and sufficient condition for stability. Using stability theory of dynamical systems and control theory, it can be shown that for stability of the system, a derivative of a Lyapunov function describing an energy of the system needs to be negative definite. In addition, the Lyapunov function has other performance guarantees. Specifically, according to principles of Lyapunov differential inequality, a derivative of an energy function converges to stability at a finite time. The finite time depends on an initial energy level, which can be a preselected constant, and other constants of Lyapunov differential inequality that can be preselected by a user.

Further, some embodiments are based on the realization that a step size of the gradient descent method can be adapted based on an energy function of the optimal control problem that follows Lyapunov stability. Such an adaptation can force the gradient descent method to reach stability, i.e., reach convergence, in the finite time guaranteed by the principles of the Lyapunov differential inequality.

Thus, some embodiments adapt the step size of the gradient descent method to optimize the cost function within the predetermined time limit. Since the step the step size of the gradient descent method is adaptable, the gradient descent method is referred to as an adaptive gradient descent method. For different iterations of the gradient descent method, the step size is determined based on a derivative of the energy function of the optimal control problem. The energy function of the optimal control problem is defined such that the derivative of the energy function is negative definite and polynomially decreasing. The negative definite requirement guarantees the convergence, while the polynomially decreasing requirement speeds up the convergence. These requirements can be satisfied by selecting appropriate constants of the Lyapunov differential inequality.

For example, consider a cost function $f:R^n \to R$ to be optimized. Let x* be an arbitrary optimal point of $f$ that is unknown. According to an embodiment, the Lyapunov differential inequality is given as $$\dot{E} \le -cE(T)^\alpha, a.e.t \ge 0 \qquad (1)$$

with hyperparameters c>0 and α<1, for absolutely continuous functions E such that E(0)>0. E is often referred to as an energy function of the system, for example, it can be a square value of a velocity of the system, or the square value of the position of the system. Under the aforementioned conditions, E(0)→0 is reached in finite time $$t \to t^* \le \frac{E(0)^{1-\alpha}}{c(1-\alpha)} < \infty.$$

Figure 1B:
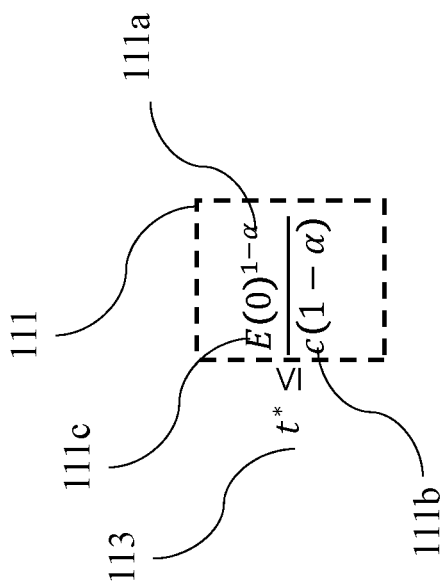
FIG. 1B shows a time bound function, according to some embodiments of the present disclosure.

To that end, at block 101, a time period (t*) of the operation of the at least one actuator is obtained. For instance, the time period (t*) of the operation of the at least one actuator is obtained from the user. Further, at block 103, an energy level (E(0)) of the at least one actuator is collected. In an embodiment, the energy level the at least one actuator corresponds to a difference between a current state and a desired state of the at least one actuator. Furthermore, at block 105, values of one or more hyperparameters of a time bound function are determined FIG. 1B shows a time bound function 111, according to some embodiments of the present disclosure. The time bound function 111 is based on one or more hypermeters 111*a* (a) and 111*b* (c), and an energy level (E(0)) 111*c*. The values of the one or more hyperparameters 111*a* and 111*b* are determined such that a value of the time bound function 111 is greater than or equal to an obtained time period (t*) 113 of the operation. The obtained time period (t*) 113 may correspond to an upper bound on time within which the operation has to be executed. For instance, the time period (t*) 113 may be in order of few seconds and the value of the time bound function 111 is greater than or equal to the seconds specified by the time period (t*) 113.

Referring back to FIG. 1A, at block 107, an optimal control problem optimizing the cost function of the operation of the actuator is solved using an adaptive gradient descent method. Here, the adaptive gradient descent method is initialized with the energy level collected for the actuator and a constant defined based on the values of the one or more hyperparameters 111*a* and 111*b*. The adaptive gradient descent method includes a varying step size. The varying step size is selected based on a derivative of an energy function of the optimal control problem defined such that the derivative of the energy function of the optimal control problem is negative definite and polynomially decreasing. Furthermore, a block 109, the actuator is controlled based on the solution of the optimal control problem.

In the following embodiments, the following Lyapunov function is chosen for optimization algorithms:

$$E(t) = f(x(t)) - f^* \tag{2}$$

Based on the chosen Lyapunov function (2), several optimization algorithms that accelerate the convergence to the optimal point x* are provided. For example, in one embodiment, a first order rescaled clipping algorithm is used to determine a value of variable x of the cost function, also called optimization vector x. In another embodiment, an automatic forward-Euler discretization algorithm is used to determine the value of the optimization vector x.

FIG. 2 shows a first order rescaled clipping algorithm 200, according to some embodiments of the present disclosure. For iteration k, at step 201, a gradient $\nabla f(x_k)$ is determined. At step 203, a varying step-size is determined as $$\eta_k = \min\left\{h_c, \frac{\gamma}{\|\nabla f(x_k)\|^{\frac{q-2}{q-1}}}\right\} \tag{3}$$

where $\|\nabla f\|$ denotes a 2-norm of a gradient vector, $\eta_k > 0$ is a varying step-size, $h_c > 0$ a positive constant time-step, $\gamma > 0$ positive constant, and $q > 1$ is a positive constant defining an exponent of the first order rescaled clipping algorithm 200. In this case, a term designed from the satisfaction of the Lyapunov differential inequality (1) is $$\frac{\gamma}{\|\nabla f(x_k)\|^{\left(\frac{q-2}{q-1}\right)}}.$$

It can be observed from (3) that the varying step-size is inversely proportional to the 2-norm of a gradient of the cost function $f$.

In one embodiment, the constants $\gamma, q$ are selected based on the values of the one or more hyperparameters 111*a* and 111*b*, as follows:

$$\gamma = -c$$
$$q = \alpha/(\alpha - 1)$$

where, c, $\alpha$ are computed based on the time period and the time bound function as $$t^* \le \frac{E(0)^{1-\alpha}}{c(1-\alpha)},$$

where E(0) is approximated by $f(x(0))$ assuming that an initial value of the cost function $f(x(0))$ is far larger than the value of an optimal cost $f(x^*)$. Indeed, this is for example true, if the cost function represents a tracking error of trajectory tracking of a desired reference where the optimal cost $f(x^*)$ is attained when the tracking error is close to zero.

At step 205, an iterative value of the optimization vector x is determined as $$x_{k+1} = x_k - \eta_k \nabla f(x_k) \tag{4}$$

where, $x_{k+1}$ is a value of the optimization vector at iteration k+1, $x_k$ is a value of the optimization vector at iteration k, $\nabla f$ denotes a gradient of the cost function $f$. When the optimization vector x reaches a neighborhood of the optimal value x* the gradient norm value becomes smaller, which makes the varying step-size values larger, which may overshoot the optimal point, so the first order rescaled clipping algorithm 200 switches to a constant step-size value $h_c$.

FIG. 3 shows a first order rescaled clipping algorithm 300, according to some other embodiments of the present disclosure. For iteration k, at step 301, a gradient $\nabla f(x_k)$ is determined. At step 303, a varying step-size is determined as $$\eta_k = \min\left\{h_c, -c\|\nabla f(x_k)\|_1^{\frac{q-2}{q-1}} \nabla f(x_k)^{-1} \text{sgn}(\nabla f(x_k))\right\} \tag{5}$$

where $\|\nabla f\|_1$ denotes a 1-norm of the gradient vector, $\eta_k > 0$ is the varying step-size, $c > 0$ a positive constant time-step, sgn defines a component-wise sign function, and $q > 1$ is a positive constant defining an exponent of the first order rescaled clipping algorithm 300. It can be observed from (5) that the varying step-size is a function of the component-wise sign function (i.e., sgn) of the gradient of the cost function.

At step 305, an iterative value of the optimization vector x is determined as $$x_{k+1} = x_k - \eta_k \nabla f(x_k) \tag{6}$$

where, $x_{k+1}$ is the value of the optimization vector at iteration k+1, $x_k$ is the value of the optimization vector at iteration k, $\nabla f$ denotes the gradient of the function $f$.

In an alternate embodiment, the iterative value of the optimization vector x is given by $$x_{k+1} = x_k - \eta_k \frac{\nabla f(x_k)}{\|\nabla f(x_k)\|^{\frac{q(x_k)-2}{q(x_k)-1}}} \tag{7}$$

$$q(x_k) < 2, \text{ if } \|x_k - x_{k-1}\| > \delta$$
$$q(x_k) = 2, \text{ if } \|x_k - x_{k-1}\| \le \delta$$

where $x_{k+1}$ is the value of the optimization vector at iteration k+1, $x_k$ is the value of the optimization vector at iteration k, $\nabla f$ denotes the gradient of the function $f$, $\|\nabla f\|$ denotes the 2-norm of the gradient vector, $\eta_k > 0$ is the varying step-size, $\delta$ is a positive threshold coefficient, and $q(x_k)$ is a state-dependent switching constant defining the exponent of (7). In (7), the switching between the varying step-size and the constant step-size is executed by making the exponent q vary as function of the value of the optimization vector x. In particular, switching between the varying step-size and the constant step-size is based on a value of the state-dependent switching constant $q(x_k)$. For instance, if a difference between values the optimization vector x of the two successive iterations $(x_k, x_{k-1})$ is larger that $\delta$, then the varying step-size (which is inversely proportional to the gradient norm) is used. If the difference between two successive iterations is smaller than $\delta$, a neighborhood of an optimal point $x^*$ is reached and switched to the state-dependent switching constant q=2, which makes denominator of the varying step-size equal to 1, leading to the constant step-size.

In another alternate embodiment, the iterative value of the optimization vector x is given by $$x_{k+1} = x_k - \eta_k \|\nabla f(x_k)\|_1^{\frac{1}{q(x_k)-1}} \text{sgn}(\nabla f(x_k))$$

$$q(x_k) < 2, \text{ if } \|x_k - x_{k-1}\| > \delta \quad (8)$$
$$q(x_k) = 2, \text{ if } \|x_k - x_{k-1}\| \leq \delta$$

where, $x_{k+1}$ is the value of the optimization vector at iteration k+1, $x_k$ is the value of the optimization vector at iteration k, $\nabla f$ denotes the gradient of the function $f$, $\|\nabla f\|_1$ denotes the 1-norm of the gradient vector, $\eta_k > 0$ is the varying step-size, $\delta$ is the positive threshold coefficient, sgn defines the component-wise sign function, and $q(x_k)$ is a state-dependent switching constant defining the exponent of (8).

In another embodiment, the iterative value of the optimization vector x is given by $$x_{k+1} = x_k - \eta_k \frac{\nabla f(x_k)}{\|\nabla f(x_k)\|^{\frac{q(x_k)-2}{q(x_k)-1}}} \quad (9)$$

$$q(x_k) < 2, \text{ if } \|\nabla f(x_k)\| > \delta$$
$$q(x_k) = 2, \text{ if } \|\nabla f(x_k)\| \leq \delta$$

where, $x_{k+1}$ is the value of the optimization vector at iteration k+1, $x_k$ is the value of the optimization vector at iteration k, $\nabla f$ denotes the gradient of the function $f$, $\|\nabla f\|$ denotes the 2-norm of the gradient vector, $\eta_k > 0$ is the varying step-size, $\delta$ is the positive threshold coefficient, and $q(x_k)$ is a state-dependent switching constant defining the exponent of (9). Here, it can be observed from (9) that the value of the state-dependent switching constant $q(x_k)$ is based on the 2-norm of the gradient of the cost function.

In another embodiment, the iterative value of the optimization vector x is given by $$x_{k+1} = x_k - \eta_k \|\nabla f(x_k)\|_1^{\frac{1}{q(x_k)-1}} \text{sgn}(\nabla f(x_k)) \quad (10)$$

$$q(x_k) < 2, \text{ if } \|\nabla f(x_k)\| > \delta$$
$$q(x_k) = 2, \text{ if } \|\nabla f(x_k)\| \leq \delta$$

where, $x_{k+1}$ is the value of the optimization vector at iteration k+1, $x_k$ is the value of the optimization vector at iteration k, $\nabla f$ denotes the gradient of the function $f$, $\|\nabla f\|_1$ denotes the 1-norm of the gradient vector $\eta_k > 0$ is the varying step-size, $\delta$ is the positive threshold coefficient, sgn defines the component-wise sign function, and $q(x_k)$ is a state-dependent switching constant defining the exponent of (10).

In another embodiment, the iterative value of the optimization vector x is given by $$x_{k+1} = x_k - \eta_k \frac{\nabla f(x_k)}{\|\nabla f(x_k)\|^{\frac{q(x_k)-2}{q(x_k)-1}}} \quad (11)$$

$$q(x_k) = F(x_k, \nabla f(x_k)), \text{ if } \|\nabla f(x_k)\| > \delta$$
$$q(x_k) = 2, \text{ if } \|\nabla f(x_k)\| \leq \delta$$

where, $x_{k+1}$ is the value of the optimization vector at iteration k+1, $x_k$ is the value of the optimization vector at iteration k, $\nabla f$ denotes the gradient of the function $f$, $\|\nabla f\|$ denotes the 2-norm of the gradient vector, $\eta_k > 0$ is the varying step-size, & is the positive threshold coefficient, and $q(x_k) = F(\cdot)$ is a state-dependent function defining the exponent of (11). The value of the state-dependent switching constant $q(x_k)$ is based on the 2-norm of the gradient of the cost function. For instance, in (11,) the value of the state-dependent switching constant corresponds to a numerical constant (i.e., 2) if the 2-norm of the gradient of the cost function is less than the positive threshold coefficient $\delta$. Further, the state-dependent switching constant corresponds to the state-dependent function $F(\cdot)$ if the 2-norm of the gradient of the cost function is greater than the positive threshold coefficient $\delta$.

In another embodiment, the iterative value of the optimization vector x is given by $$x_{k+1} = x_k - \eta_k \frac{\nabla f(x_k)}{\|\nabla f(x_k)\|^{\frac{q(x_k)-2}{q(x_k)-1}}} \quad (12)$$

$$q(x_k) = F(x_k, \nabla f(x_k)), \text{ if } \|x_k - x_{k-1}\| > \delta$$
$$q(x_k) = 2, \text{ if } \|x_k - x_{k-1}\| \leq \delta$$

where, $x_{k+1}$ is the value of the optimization vector at iteration k+1, $x_k$ is the value of the optimization vector at iteration k, $\nabla f$ denotes the gradient of the function $f$, $\|\nabla f\|$ denotes the 2-norm of the gradient vector, $\eta_k > 0$ is the varying step-size, $\delta$ is the positive threshold coefficient, and $q(x_k) = F(\cdot)$ is a state-dependent function defining the exponent of (12).

In another embodiment, the iterative value of the optimization vector x is given by $$x_{k+1} = x_k - \eta_k \|\nabla f(x_k)\|_1^{\frac{1}{q(x_k)-1}} \text{sgn}(\nabla f(x_k)) \quad (13)$$

$$q(x_k) = F(x_k, \nabla f(x_k)), \text{ if } \|\nabla f(x_k)\| > \delta$$
$$q(x_k) = 2, \text{ if } \|\nabla f(x_k)\| \leq \delta$$

where, $x_{k+1}$ is the value of the optimization vector at iteration k+1, $x_k$ is the value of the optimization vector at iteration k, $\nabla f$ denotes the gradient of the function $f$, $\|\nabla f\|_1$ denotes the 1-norm of the gradient vector, $\eta_k > 0$ is the varying step-size, $\delta$ is the positive threshold coefficient, sgn defines the component-wise sign function, and $q(x_k)=F(\cdot)$ is a state-dependent function defining the exponent of (13).

In another embodiment, the iterative value of the optimization vector x is given by $$x_{k+1} = x_k - \eta_k \|\nabla f(x_k)\|_1^{\frac{1}{q(x_k)-1}} \operatorname{sgn}(\nabla f(x_k)) \quad (14)$$

$$q(x_k) = F(x_k, \nabla f(x_k)), \text{ if } \|x_k - x_{k-1}\| > \delta$$

$$q(x_k) = 2, \text{ if } \|x_k - x_{k-1}\| \leq \delta$$

where, $x_{k+1}$ is the value of the optimization vector at iteration k+1, $x_k$ is the value of the optimization vector at iteration k, $\nabla f$ denotes the gradient of the function $f$, $\|\nabla f\|_1$ denotes the 1-norm of the gradient vector, $\eta_k > 0$ is the varying step-size, & is the positive threshold coefficient, sgn defines the component-wise sign function, and $q(x_k)=F(\cdot)$ is a state-dependent function defining the exponent of (14).

In some embodiments, the state-dependent function $F(\cdot)$ used in (11)-(14), can be defined as $$F(\cdot) \in \left\{ (q_k(x_k), S_k(x_k)), \text{ s.t;} \right. \quad (15)$$

$$\left. f\left(x_k^j - f(x_k) - \langle \nabla f(x_k), x_k^{-j} - x_k \rangle \right) \leq \frac{S_k(x_k)}{q_k(x_k)} \|x_k^j - x_k\|^{q_k(x_k)} \right\}$$

where, $x_k^j$ is a set of state sampled around $x_k$ with a size of $N_k$, $\nabla f$ denotes the gradient of the function $f$, $\|\cdot\|$ denotes the 2-norm, $\langle \cdot \rangle$ denotes an inner product in Euclidian space, $q_k(x_k)$, $S_k(x_k)$ are solutions of the inequality $$f\left(x_k^j - f(x_k) - \langle \nabla f(x_k), x_k^{-j} - x_k \rangle \right) \leq \frac{S_k(x_k)}{q_k(x_k)} \|x_k^j - x_k\|^{q_k(x_k)} \quad (16)$$

Figure 4:
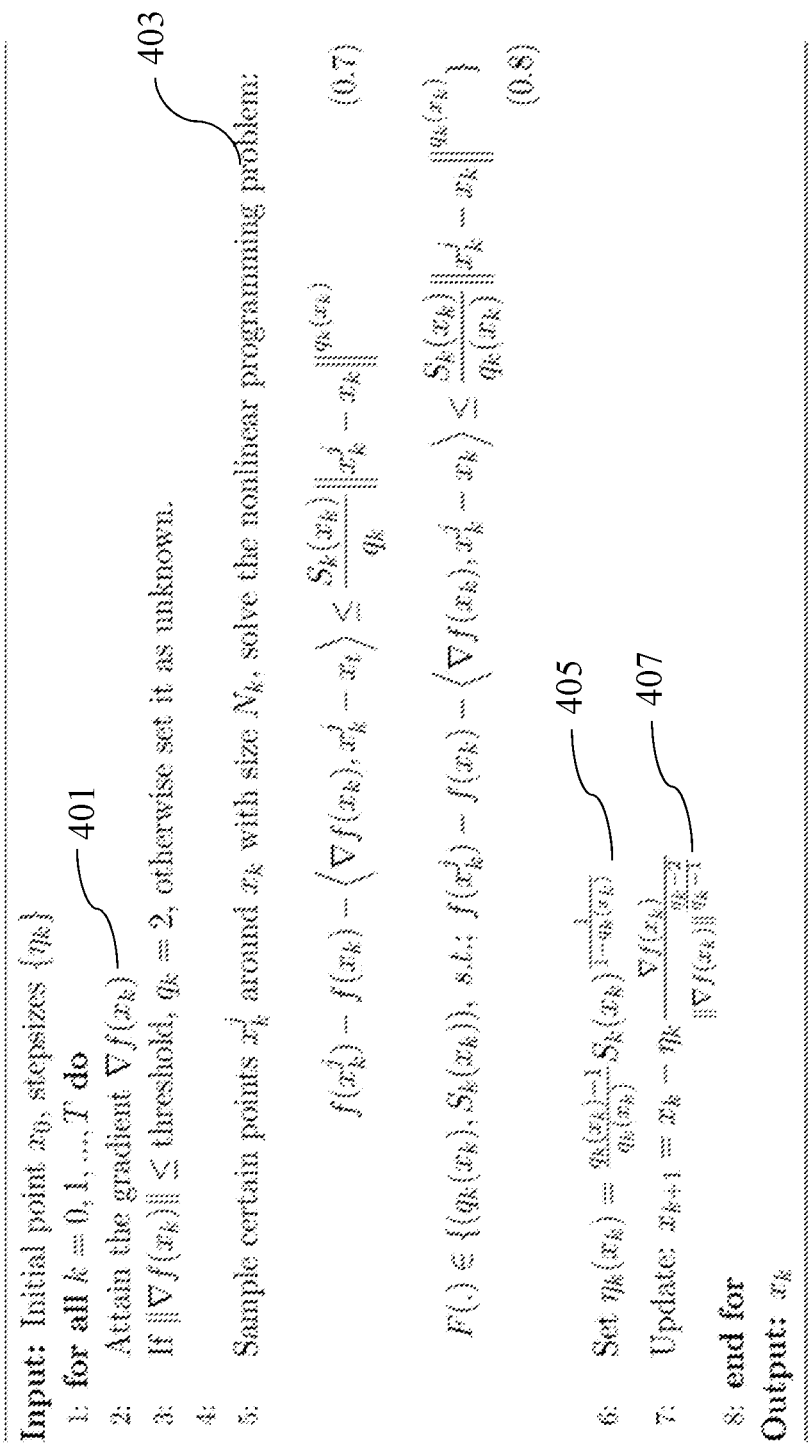
FIG. 4 illustrates an automatic forward-Euler discretization algorithm, according to some embodiments of the present disclosure.

Additionally or alternatively, in some embodiments, the automatic forward-Euler discretization algorithm is used to determine the value of the optimization vector x. FIG. 4 shows a schematic of an automatic forward-Euler discretization algorithm 400 for determining the value of the optimization vector x, according to some embodiments of the present disclosure. For iteration k, at step 401, a gradient $\nabla f(x_k)$ is determined. At step 403, a non-linear programming problem is solved:

$$f\left(x_k^j - f(x_k) - \langle \nabla f(x_k), x_k^{-j} - x_k \rangle \right) \leq \frac{S_k(x_k)}{q_k(x_k)} \|x_k^j - x_k\|^{q_k(x_k)} \quad (17)$$

$$F(\cdot) \in \left\{ (q_k(x_k), S_k(x_k)), \text{ s.t;} \right.$$

$$\left. f\left(x_k^j - f(x_k) - \langle \nabla f(x_k), x_k^{-j} - x_k \rangle \right) \leq \frac{S_k(x_k)}{q_k(x_k)} \|x_k^j - x_k\|^{q_k(x_k)} \right\}$$

where, $x_k^j$ is a set of state sampled around xx with a size of $N_k$, $\nabla f$ denotes the gradient of the function $f$, $\|\cdot\|$ denotes the 2-norm, $\langle \cdot \rangle$ denotes an inner product in Euclidian space.

At step 405, a varying step-size $\eta_k$ is determined as $$\eta_k(x_k) = \frac{q_k(x_k) - 1}{q_k(x_k)} S_k(x_k)^{\frac{1}{1-q_k(x_k)}} \quad (18)$$

At step 407, an iterative value of the optimization vector x is determined as $$x_{k+1} = x_k - \eta_k \frac{\nabla f(x_k)}{\|\nabla f(x_k)\|^{\frac{q(x_k)-2}{q(x_k)-1}}} \quad (19)$$

Figure 5:
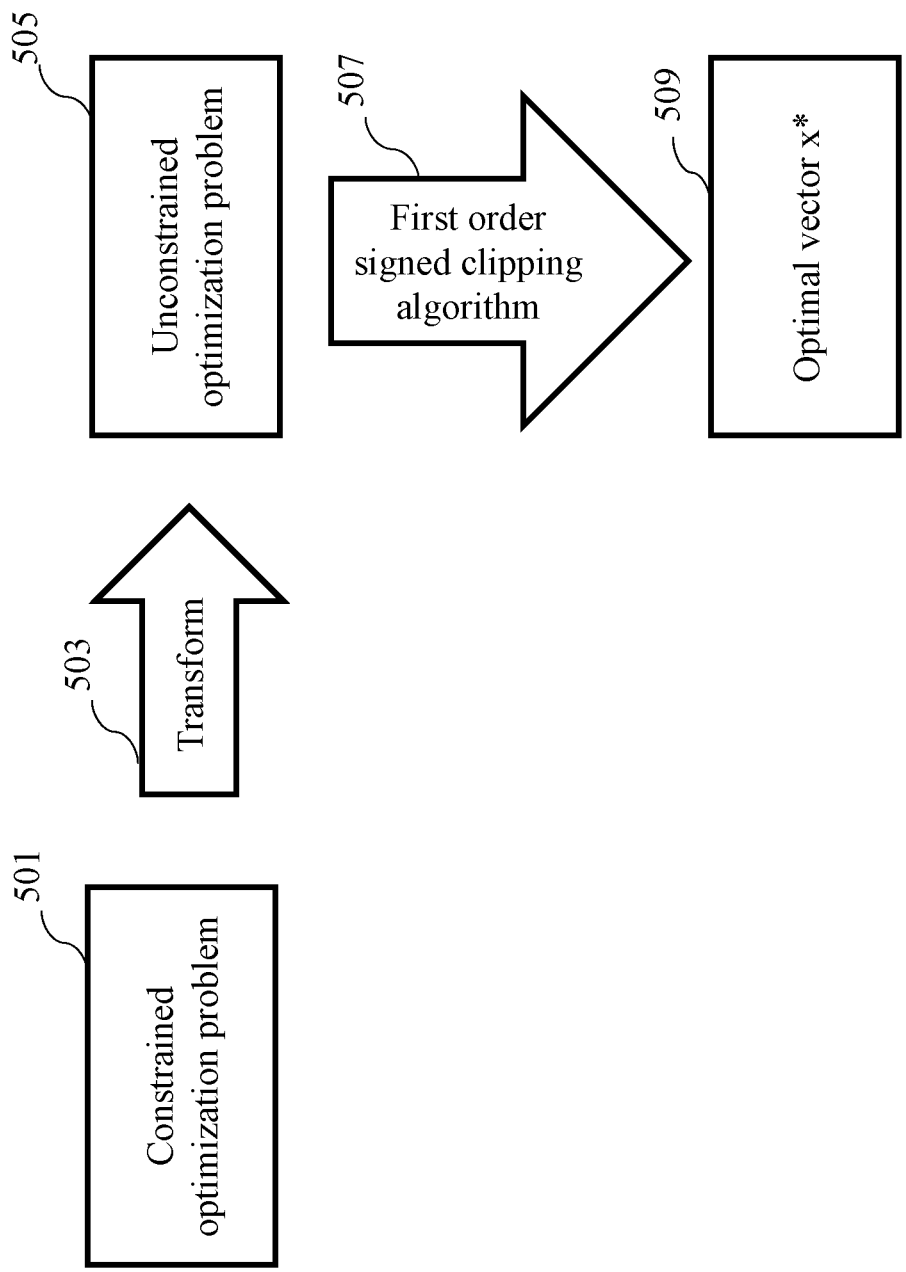
FIG. 5 illustrates a block diagram of a method for solving a constrained optimization problem, according to some embodiments of the present disclosure.

Additionally or alternatively, in some cases, the optimization vector x needs to remain within a certain desired bound. In such cases, the optimal control problem is said to be a constrained optimization problem. FIG. 5 shows a schematic for solving the constrained optimization problem, according to some embodiments of the present disclosure. In an embodiment, a constrained optimization problem 501 is given by $$\underset{x \in \mathbb{R}^n}{\operatorname{minimize}} f(x) \quad (20)$$

$$\text{subject to } h_j(x) \geq 0, j = 1, \ldots, p$$

$$g_i(x) \geq 0, i = 1, \ldots, e$$

With $f$, $h_1, \ldots, h_p$, $g_1, \ldots, g_e$: $\mathbb{R}^n \to \mathbb{R}$, where h; $(\cdot)$, j=1, . . . , p, represent inequality constraints, and $g_i(\cdot)$, i=1, . . . , e, represent equality constraints.

The constrained optimization problem 501 is transformed 503 into the following unconstrained optimization problem 505

$$f_\mu(x) \stackrel{\text{def}}{=} f(x) - \mu \sum_{j=1}^{p} \log h_j(x) + \frac{1}{2\mu} \sum_{i=1}^{i=e} g_i^2(x) \quad \text{i. (21)}$$

where $\mu > 0$, is a penalty parameter. Further, a first order signed clipping algorithm 507 is used to obtain an optimal vector x* 509 for the new cost function $f_\mu(x)$ in finite time. The optimal vector x* 509 is also an optimal vector for the constrained optimization problem 501, for a proper choice of coefficient $\mu > 0$. The first order signed clipping algorithm 507 may correspond to the first order signed clipping algorithm 200 or the first order signed clipping algorithm 300.

In some cases, there is no direct access to a closed form expression of the cost function $f(x)$. In such cases, the gradient of the cost function is computed in several ways. In one embodiment, a first order derivative of the cost function, also known as gradient $\nabla f(x)$, is computed by numerical differentiation as $$\nabla f(x) = \frac{f(x + \text{delta}_x) - f(x)}{\text{delta}_x}, \quad (22)$$

where $\text{delta}_x > 0$ is a differentiation step.

In another embodiment, the gradient is computed using filters as $$\nabla f(x) = G_{grad} * f(x), \quad (23)$$

where $G_{grad}$ represents a gradient computation filter, and * denotes a convolution operator.

In yet another embodiment, the gradient is computed using dither signals-based gradient filters. The dither signals-based gradient filters may be designed using trigonometric functions, e.g., sine and cosine functions.

In some embodiments, the machine may include a plurality of actuators and each actuator is configured to perform an operation. The operations of the plurality of actuators is desired to be executed in a synchronous manner. In such a scenario, a controller employing principles of the present of the disclosure may be used to control the plurality of actuators such that the operations of the plurality of actuators is executed in the synchronous manner, as described below in FIG. 6A and FIG. 6B.

Figure 6A:
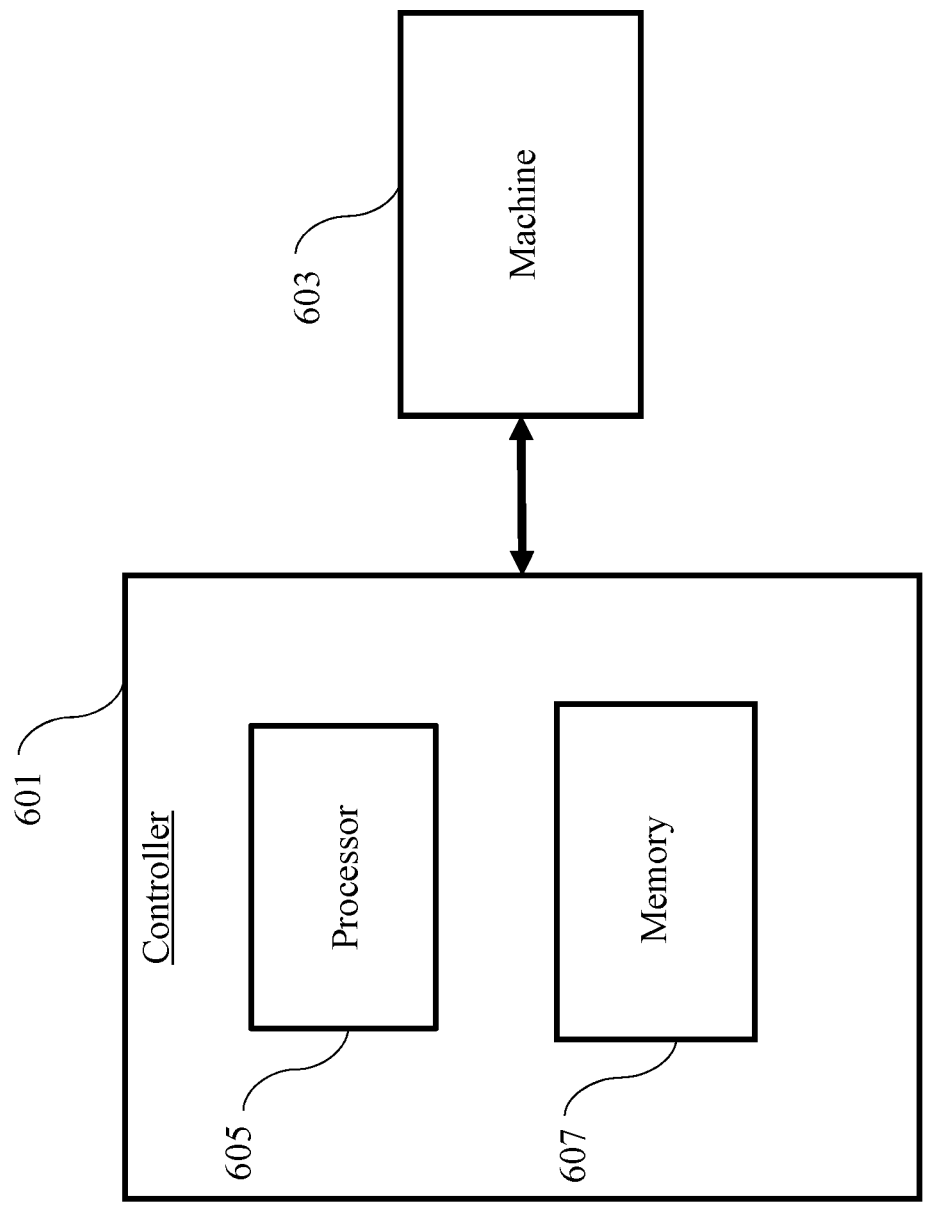
FIG. 6A illustrates a controller communicatively coupled to the machine, according to an embodiment of the present disclosure.

FIG. 6A illustrates a controller 601 communicatively coupled to a machine 603, according to an embodiment of the present disclosure. The controller 601 includes a processor 605 and a memory 607. The processor 605 may be a single core processor, a multi-core processor, a computing cluster, or any number of other configurations. The memory 607 may include random access memory (RAM), read only memory (ROM), flash memory, or any other suitable memory systems. Additionally, in some embodiments, the memory 607 may be implemented using a hard drive, an optical drive, a thumb drive, an array of drives, or any combinations thereof.

Figure 6B:
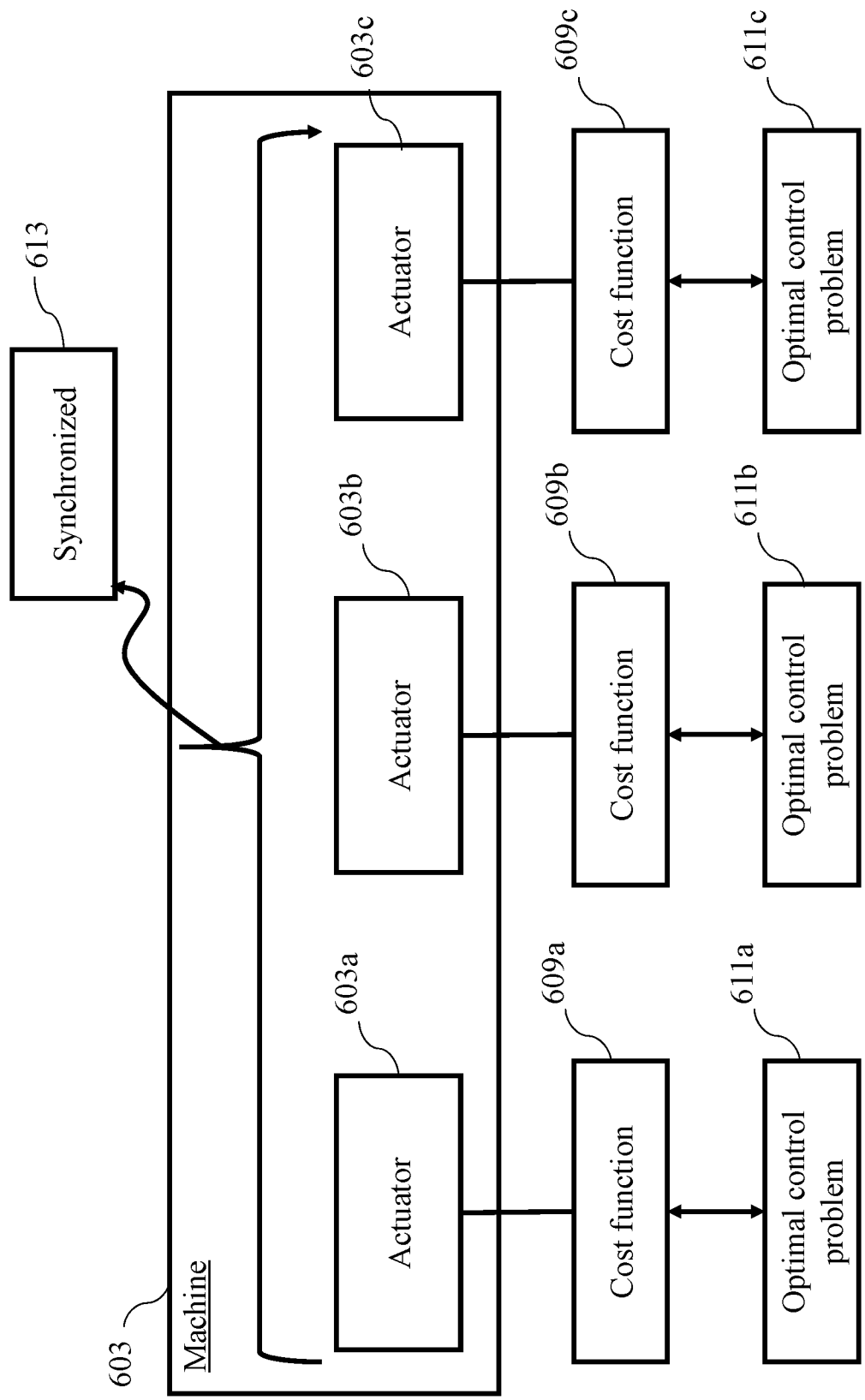
FIG. 6B illustrates a schematic of the machine, according to an embodiment of the present disclosure.

FIG. 6B shows a schematic of the machine 603, according to an embodiment of the present disclosure. The machine 603 includes a plurality of actuators, for example, an actuator 603a, an actuator 603b, and an actuator 603c (which are collectively referred to hereinafter as the plurality of actuators 603a, 603b, and 603c). Each actuator is configured to perform a corresponding operation. The machine 603 may be an assembly system configured to perform an assembly operation by synchronized 613 operations of the plurality of actuators 603a, 603b, and 603c, such as moving an object through a sequence of locations, machining a workpiece by different tools in a predetermined sequential or partially overlapping order, and a combination thereof.

Each actuator is associated with a cost function to be optimized. For instance, the actuator 603a is associated with a cost function 609a of the operation of the actuator 603a. The actuator 603b is associated with a cost function 609b of the operation of the actuator 603b. Likewise, the actuator 603c is associated with a cost function 609c of the operation of the actuator 603c. Further, optimal control problems, such as an optimal control problem 611a, an optimal control problem 611b, and an optimal control problem 611c are solved to optimize the cost function 609a, the cost function 609b, and the cost function 609c, respectively.

To solve the optimal control problems, the processor 605, at first, obtains a time period (t*) of the operation of each actuator of the plurality of actuators 603a, 603b, and 603c. For instance, the processor 605 receives, from the user, the time period (t*) of the operation of each actuator. The processor 605 further collects an energy level (E(0)) of each actuator of the plurality of actuators 603a, 603b, and 603c. Furthermore, the processor 605 determines values of one or more hyperparameters (e.g., the hyperparameters 111a and 111b) of a time bound function (e.g., the time bound function 111) such that a value of the time bound function is greater than or equal to an obtained time period (t*) of the operation.

Further, the processor 605 solves, for each actuator, a corresponding optimal control problem optimizing a cost function of the operation of the actuator using an adaptive gradient descent method. The adaptive gradient descent method is initialized with the energy level collected for the actuator and a constant defined based on the values of the one or more hyperparameters and includes a varying step size. The varying step size is selected based on a derivative of an energy function of the corresponding optimal control problem defined such that the derivative of the energy function of the corresponding optimal control problem is negative definite and polynomially decreasing.

For example, for the actuator 603a, the processor 605 solves the optimal control problem 611a optimizing the cost function 609a of the operation of the actuator 603a using the adaptive gradient descent method. Here, the adaptive gradient descent method is initialized with the energy level collected for the actuator 603a and the constant defined based on the values of the one or more hyperparameters 113a and 113b, and the varying step size is selected based on a derivative of an energy function of the optimal control problem 611a defined such that the derivative of the energy function of the optimal control problem 611a is negative definite and polynomially decreasing. Likewise, for actuators 603b and the 603c, the processor 605 solves the corresponding optimal control problems 611b and 611c.

Furthermore, the processor 605 controls each of the plurality of actuators 603a-603c, based on a solution of the corresponding optimal control problem. For instance, the processor 605 controls the actuator 603a, based on the solution of the optimal control problem 611a.

Some embodiments are based on realization that the controller 601 can be employed in robotics application. For example, the controller 601 can be used to control a robotic arm manipulator end effector to move from an initial position to a desired position, with a desired initial velocity and a desired final velocity. In such example, the cost function $f(x)$ can be written as $$f(x) = (\text{effector}_x(\theta) - x^*)^2 + (\text{effector}_y(\theta) - y^*)^2 + (V\text{effector}_x(\dot{\theta}) - Vx^*)^2 + (V\text{effector}_y(\dot{\theta}) - Vy^*)^2,$$

where x is defined as $x=(\theta,\dot{\theta})^T$, where $\theta \in R^n$ represents a vector of robotic arm manipulator angles, and $\dot{\theta} \in R^n$ represents a vector of robotic arm manipulator articulation angular velocities. $\text{effector}_x(\theta)$, $\text{effector}_y(\theta)$ represent a x-y position of the robotic arm manipulator end effector in a planar work frame, and are defined as function of the vector of the robotic arm manipulator articulation angles $\theta \in R^n$, as $$(\text{effector}_x(\theta), \text{effector}_y(\theta)) = \text{forward\_geometric}(\theta),$$

where forward_geometric represents a forward kinematic model of the robotic arm manipulator.

$V\text{effector}_x(\dot{\theta})$, $V\text{effector}_y(\dot{\theta})$ represent a Vx-Vy velocity of the robotic arm manipulator end effector in the planar work frame, and are defined as function of the vector of the robotic arm manipulator articulation angular velocities $\dot{\theta} \in R^n$, as $$(V\text{effector}_x(\dot{\theta}), V\text{effector}_y(\dot{\theta})) = \text{forward\_kinematic}(\dot{\theta}),$$

where forward_kinematic represents the forward kinematic model of the robotic manipulator arm. Finally, x*, y* represent a desired x-y position of the robotic arm manipulator end effector in the planar work frame, and Vx*, Vy* represent a desired Vx-Vy velocity of the robotic arm end effector in the planar work frame.

Further, the controller 601 executes the first order signed clipping algorithm 200 or the first order signed clipping algorithm 300, to determine a series of points x(t)=(θ(t), θ̇(t))$^T$ at successive time instants t from a given initial angular configuration of the robotic manipulator arm x(0)= (θ(0), θ̇(0))$^T$ to a desired optimal configuration of the robotic manipulator arm x(t*)=x*=(θ(t*), θ̇(t*))$^T$. Further, based on the series of points, the controller 601 controls the robot manipulator arm to the successive series of points, leading the robot manipulator arm end effector from a given initial position to the desired position.

Figure 7:
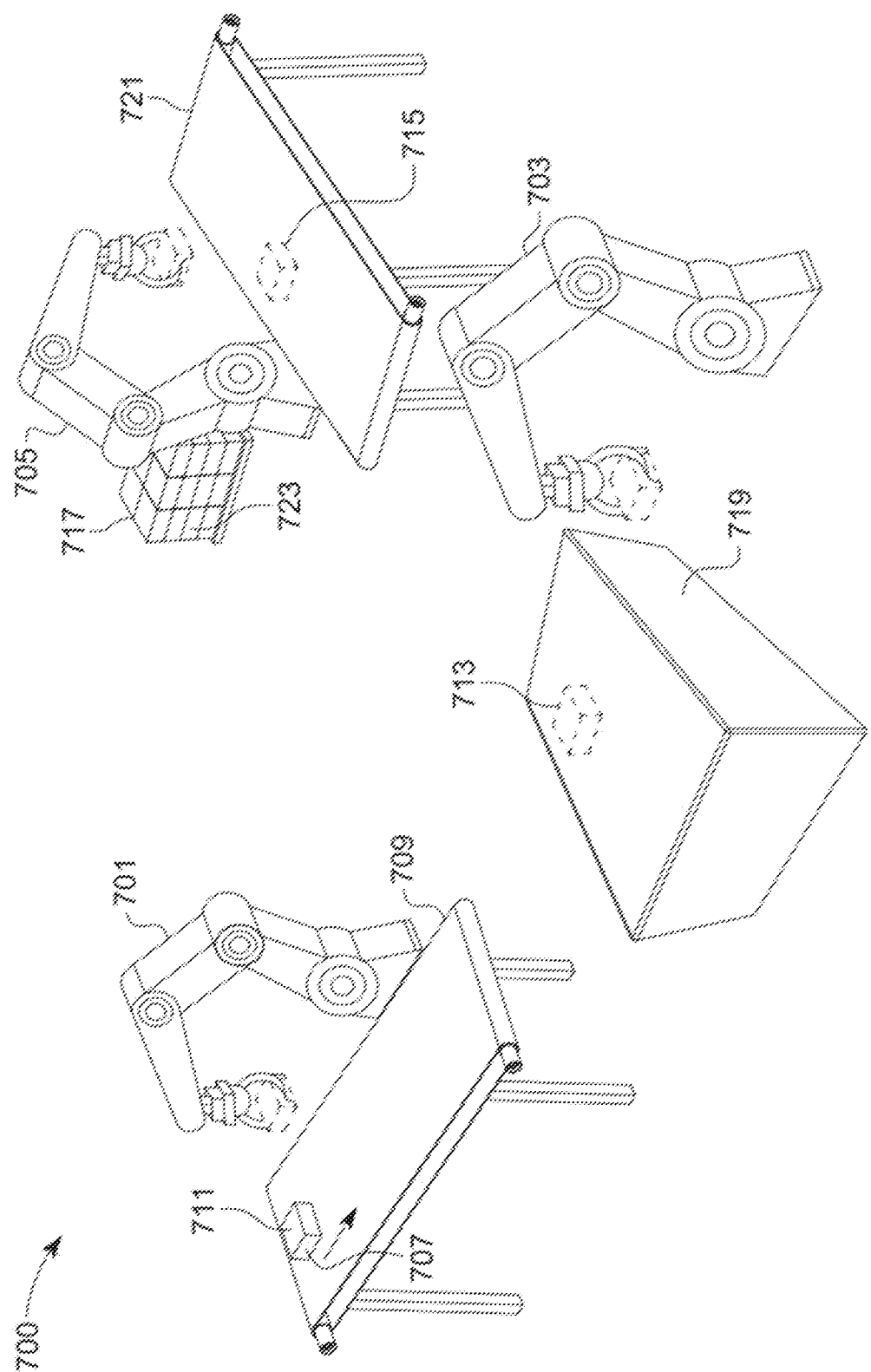
FIG. 7 illustrates a schematic of a factory automation scene employing the controller, according to an embodiment of the present disclosure.

Additionally, the controller 601 can be used in factory automation where multiple operations need to be synchronized in time. For instance, the factory automation may include a machine including a plurality of robots and the controller may be configured to control operations of the plurality of robots such that the operations are executed in a synchronized manner. FIG. 7 shows a schematic of a factory automation scene 700 employing the controller 601, according to an embodiment of the present disclosure. Multiple robots, such as a robot 701, a robot 703, and a robot 705 are communicatively coupled with the controller 601 (not shown in figure). The robot 701, the robot 703, and the robot 705 are collectively referred to hereinafter as the multiple robots 701, 703, and 705. In the factory automation scene 700, the multiple robots 701, 703, and 705 manipulate an object 707 moving on a conveyer belt 709. For example, the robot 701 is configured to move the object 707 from a position 711 on the conveyer belt 709 to a position 713 on a structure 719, the robot 703 is configured to move the object 707 from the position 713 to a position 715 on a conveyer belt 721, and the robot 705 is configured to move the object 707 from the position 715 to a position 717 to stack the object 707 on other objects 723. Such operations of the robots 701, 703, and 705 can be labelled as operation1, operation2, and operation3, respectively. Positions of the robots 701, 703, and 705 corresponding to the positions 713, 715, and 717 of the object 707, respectively, are referred to as desired positions of the robots 701, 703, and 705. The sequence of operations: operation1, operation2, and operation3 need to be synchronized.

Each operation can be formulated as an optimal control problem, e.g., moving an object between two desired positions can be seen at a high-level optimization of control actions, in a form of joint angular positions and velocities optimal references of the robot, to minimize a distance between a present position and orientation of the object and a desired position and orientation of the object. The controller 601 solves each optimal control problem to determine a solution including control actions for each robot. The control actions may be joint torque control actions needed to move the object between the desired positions and orientations. As described above in FIG. 1A and FIG. 1B, the controller 601 guarantees that each separate operation is achieved within a desired time. Indeed, if it is assumed that every robot will start its operation with an error from the desired or optimal point, such that all the errors $E_i(0)$, i=1, . . . , n are less than $\bar{E}$, the first order signed clipping algorithm 200 or the first order signed clipping algorithm 300 is executed by the controller 601 to achieve the desired position of each robot within $$t_i^* \leq \frac{\bar{E}(0)^{1-\alpha_i}}{c_i(1-\alpha_i)}, i=1, \ldots n.$$

In such a manner, the controller 601 controls the operation of each robot based on the solution of the corresponding optimal control problem to synchronously perform the sequence of operations—opeation1, operation2, and opeation3.

The time convergence upper bound ti*for each operation guarantees that the operation1, operation2, and opeation3 are achieved within time frame $$\sum_{i=1}^{i=n} t_i^* \leq n \frac{\bar{E}(0)^{1-\bar{\alpha}}}{\bar{c}(1-\bar{\alpha})},$$

where $\underline{\alpha}$=min $\alpha_i$, $\bar{\alpha}$=max $\alpha_i$, $\bar{c}$=min $c_i$. Furthermore, based on the time convergence bounds, any operation may be started after knowing that preceding tasks have been completed, simply by waiting for the time to reach their convergence time bound, without having to monitor actual completion of the preceding tasks.

Figure 8:
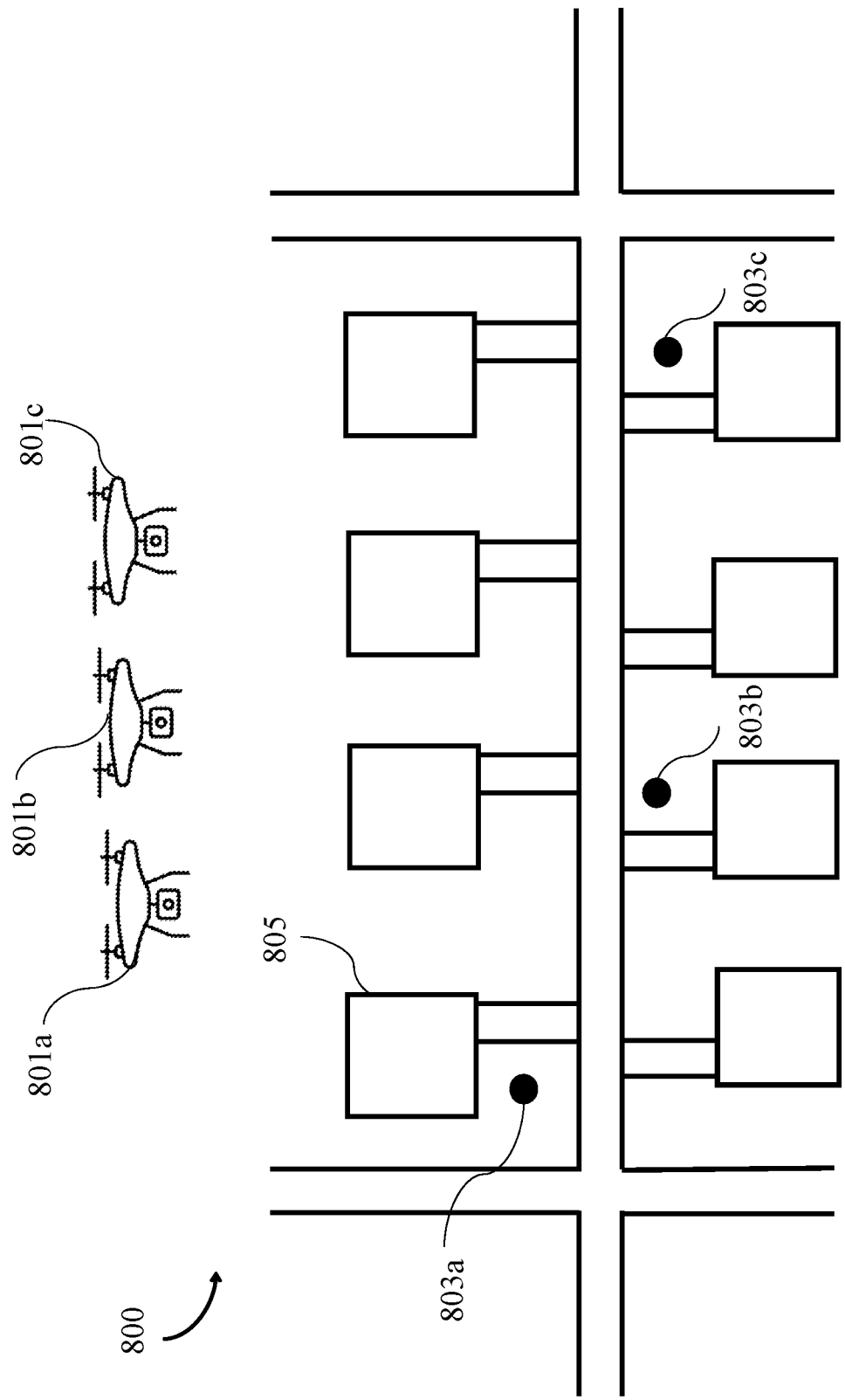
FIG. 8 illustrates controlling of operations of drones by the controller, according to an embodiment of the present disclosure.

Additionally, the controller 601 can be for used for controlling aerial vehicles, such as drones, to synchronously perform a number of operations. FIG. 8 illustrates controlling of operations of the drones by the controller 601, according to an embodiment of the present disclosure. A drone 801*a*, a drone 801*b*, and a drone 810*c* (collectively referred to as drones 801*a*, 801*b*, and 801*c*) are communicatively coupled to the controller 601 (not shown in figure). The drones 801*a*, 801*b*, and 801*c* may be various types of Unmanned Aerial Vehicles (UAVs) including autonomously controlled or remotely controlled UAVs. In some examples, each drone can include a communication interface to communicate with the controller 601. In addition, each drone can include a sensor package. The sensor package can include, but is not limited to, navigation sensors (e.g., GPS receivers), cameras, environmental sensors, surface mapping sensors, and object delivery equipment.

Each drone is used for delivering a package to a user within a specified time period. For example, 800 represents a map of a residential area of a city including buildings, such as a building 805, and an operation of the drone 801*a* is to deliver a package to a user location 803*a* within a first time period. Likewise, an operation of the drone 801*b* is to deliver another package to a user location 803*b* within a second time period, and an operation of the drone 801*c* is to deliver yet another package to a user location 803*b* within a third time period. Each operation can be formulated as an optimal control problem of minimizing a distance between a current location of the drone and the user location. The controller 601 receives a schedule including the first time period, the second time period and the third time period. Further, the controller 601 determines control commands for each drone by solving the corresponding optimal control problem using the adaptive gradient descent method. The controller 601 transmits the control commands to the drones 801*a*, 801*b*, and 801*c*. The control commands cause the drones 801*a*, 801*b*, and 801*c* to deliver their respective package within their respective time periods accurately.

Figure 9:
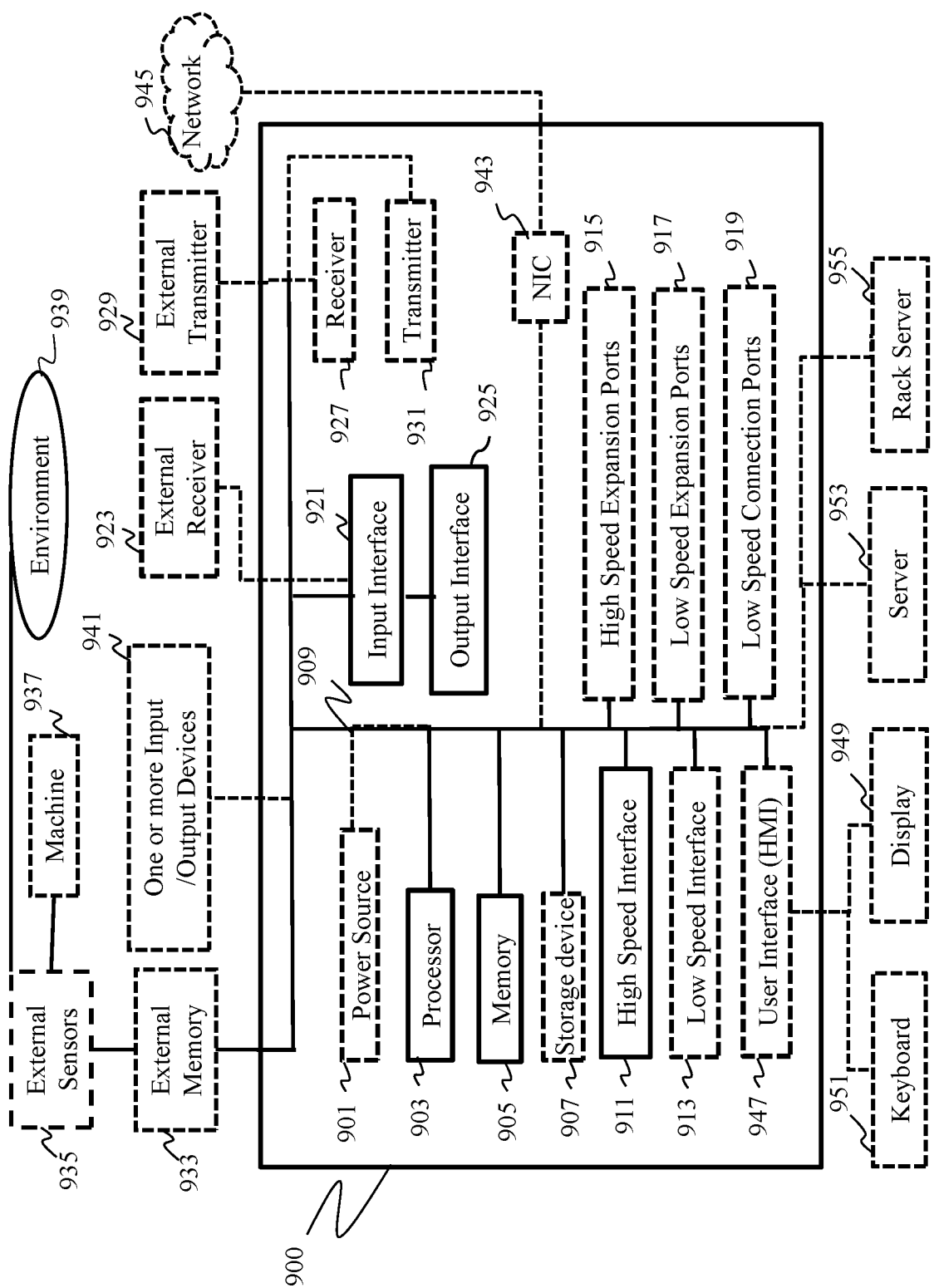
FIG. 9 illustrates a schematic diagram illustrating a computing device that can be used for implementing the controller of the present disclosure.

FIG. 9 is a schematic illustrating a computing device 900 for implementing the controller 601 of the present disclosure. The computing device 900 includes a power source 901, a processor 903, a memory 905, a storage device 907, all connected to a bus 909. Further, a high-speed interface 911, a low-speed interface 913, high-speed expansion ports 915 and low speed connection ports 917, can be connected to the bus 909. In addition, a low-speed expansion port 919 is in connection with the bus 909. Further, an input interface 921 can be connected via the bus 909 to an external receiver 923 and an output interface 925. A receiver 927 can be connected to an external transmitter 929 and a transmitter 931 via the bus 909. Also connected to the bus 909 can be an external memory 933, external sensors 935, machine(s) 937, and an environment 939. Further, one or more external input/output devices 941 can be connected to the bus 909. A network interface controller (NIC) 943 can be adapted to connect through the bus 909 to a network 945, wherein data or other data, among other things, can be rendered on a third-party display device, third party imaging device, and/or third-party printing device outside of the computing device 900.

The memory 905 can store instructions that are executable by the computing device 900 and any data that can be utilized by the methods and systems of the present disclosure. The memory 905 can include random access memory (RAM), read only memory (ROM), flash memory, or any other suitable memory systems. The memory 905 can be a volatile memory unit or units, and/or a non-volatile memory unit or units. The memory 905 may also be another form of computer-readable medium, such as a magnetic or optical disk.

The storage device 907 can be adapted to store supplementary data and/or software modules used by the computer device 900. The storage device 907 can include a hard drive, an optical drive, a thumb-drive, an array of drives, or any combinations thereof. Further, the storage device 907 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 903), perform one or more methods, such as those described above.

The computing device 900 can be linked through the bus 909, optionally, to a display interface or user Interface (HMI) 947 adapted to connect the computing device 900 to a display device 949 and a keyboard 951, wherein the display device 949 can include a computer monitor, camera, television, projector, or mobile device, among others. In some implementations, the computer device 900 may include a printer interface to connect to a printing device, wherein the printing device can include a liquid inkjet printer, solid ink printer, large-scale commercial printer, thermal printer, UV printer, or dye-sublimation printer, among others.

The high-speed interface 911 manages bandwidth-intensive operations for the computing device 900, while the low-speed interface 913 manages lower bandwidth-intensive operations. Such allocation of functions is an example only. In some implementations, the high-speed interface 911 can be coupled to the memory 905, the user interface (HMI) 949, and to the keyboard 951 and the display 949 (e.g., through a graphics processor or accelerator), and to the high-speed expansion ports 915, which may accept various expansion cards via the bus 909. In an implementation, the low-speed interface 913 is coupled to the storage device 907 and the low-speed expansion ports 917, via the bus 909. The low-speed expansion ports 917, which may include various communication ports (e.g., USB, Bluetooth, Ethernet, wireless Ethernet) may be coupled to the one or more input/output devices 941. The computing device 900 may be connected to a server 953 and a rack server 955. The computing device 900 may be implemented in several different forms. For example, the computing device 900 may be implemented as part of the rack server 955.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling an operation of a machine including at least one actuator, the controller comprising: a processor; and a memory having instructions stored thereon that, when executed by the processor, cause the controller to:
obtain a time period of an operation of the at least one actuator;
collect an energy level of the at least one actuator, wherein the energy level of the at least one actuator corresponds to a difference between a current state of the at least one actuator and a desired state of the at least one actuator;
determine values of one or more hyperparameters of a time bound function such that a value of the time bound function is greater than or equal to the time period of the operation of the at least one actuator;

solve an optimal control problem optimizing a cost function of the operation of the at least one actuator using an adaptive gradient descent method, wherein the adaptive gradient descent method is initialized with the collected energy level and a constant defined based on the values of one or more hyperparameters, and wherein the adaptive gradient descent method includes a varying step size selected based on a derivative of an energy function of the optimal control problem defined such that the derivative of the energy function of the optimal control problem is negative definite and polynomially decreasing; and control the at least one actuator based on the solution of the optimal control problem.

2. The controller of claim 1, wherein the varying step-size is inversely proportional to a 2-norm of a gradient of the cost function.

3. The controller of claim 1, wherein the varying step-size is a function of a component-wise sign function of a gradient of the cost function.

4. The controller of claim 1, wherein the processor is further configured to switch between the varying step-size and a constant step-size, based on a value of a state-dependent switching constant.

5. The controller of claim 4, wherein the value of the state-dependent switching constant is based on a 2-norm of a gradient of the cost function.

6. The controller of claim 5, wherein the value of the state-dependent switching constant corresponds to a numerical constant if the 2-norm of the gradient of the cost function is less than a positive threshold coefficient.

7. The controller of claim 6, wherein the state-dependent switching constant corresponds to a state-dependent function if the 2-norm of the gradient of the cost function is greater than the positive threshold coefficient.

8. The controller of claim 1, wherein the optimal control problem is a constrained optimization problem.

9. The controller of claim 8, wherein the processor is further configured to transform the constrained optimization problem into an unconstrained optimization problem.

10. The controller of claim 1, wherein the processor is further configured to compute a gradient of the cost function based on numerical differentiation of the cost function.

11. The controller of claim 1, wherein the processor is further configured to compute a gradient of the cost function based on a gradient computation filter.

12. The controller of claim 1, wherein the machine includes a plurality of robots for performing a sequence of operations, and wherein the processor is configured to control an operation of each robot based on a solution of the corresponding optimal control problem to synchronously perform the sequence of operations.

13. A method for controlling an operation of a machine including at least one actuator, the method comprising:

obtaining a time period of an operation of the at least one actuator;

collecting an energy level of the at least one actuator, wherein the energy level of the at least one actuator corresponds to a difference between a current state and a desired state of the at least one actuator;

determining values of one or more hyperparameters of a time bound function such that a value of the time bound function is greater than or equal to the time period of the operation of the at least one actuator;

solving an optimal control problem optimizing a cost function of the operation of the at least one actuator using an adaptive gradient descent method, wherein the adaptive gradient descent method is initialized with the collected energy level and a constant defined based on the values of one or more hyperparameters, and wherein the adaptive gradient descent method includes a varying step size selected based on a derivative of an energy function of the optimal control problem defined such that the derivative of the energy function of the optimal control problem is negative definite and polynomially decreasing; and controlling the at least one actuator based on the solution of the optimal control problem.

14. The method of claim 13, wherein the varying step-size is inversely proportional a 2-norm of a gradient of the cost function.

15. The method of claim 13, wherein the varying step-size is a function of a component-wise sign function of a gradient of the cost function.

16. The method of claim 13, wherein the method further comprises switching between the varying step-size and a constant step-size, based on a value of a state-dependent switching constant.

17. The method of claim 16, wherein the value of the state-dependent switching constant is based on a 2-norm of a gradient of the cost function.

18. The method of claim 17, wherein the value of the state-dependent switching constant corresponds to a numerical constant if the 2-norm of the gradient of the cost function is less than a positive threshold coefficient.

19. The method of claim 18, wherein the state-dependent switching constant corresponds to a state-dependent function if the 2-norm of the gradient of the cost function is greater than the positive threshold coefficient.

20. A non-transitory computer-readable storage medium embodied thereon a program executable by a processor for performing a method for controlling an operation of a machine including at least one actuator, the method comprising:

obtaining a time period of an operation of the at least one actuator;

collecting an energy level of the at least one actuator, wherein the energy level of the at least one actuator corresponds to a difference between a current state and a desired state of the at least one actuator;

determining values of one or more hyperparameters of a time bound function such that a value of the time bound function is greater than or equal to the time period of the operation of the at least one actuator;

solving an optimal control problem optimizing a cost function of the operation of the at least one actuator using an adaptive gradient descent method, wherein the adaptive gradient descent method is initialized with the collected energy level and a constant defined based on the values of one or more hyperparameters, and wherein the adaptive gradient descent method includes a varying step size selected based on a derivative of an energy function of the optimal control problem defined such that the derivative of the energy function of the optimal control problem is negative definite and polynomially decreasing; and controlling the at least one actuator based on the solution of the optimal control problem.

* * * * *